(No Model.)
J. J. MOORE & J. A. BALL.
BELT GUARD FOR STRAW CARRIERS.
No. 318,491. Patented May 26, 1885.
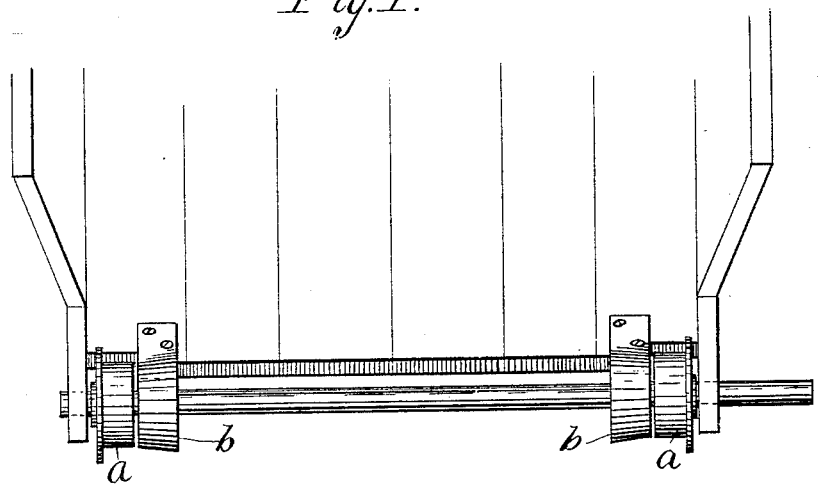
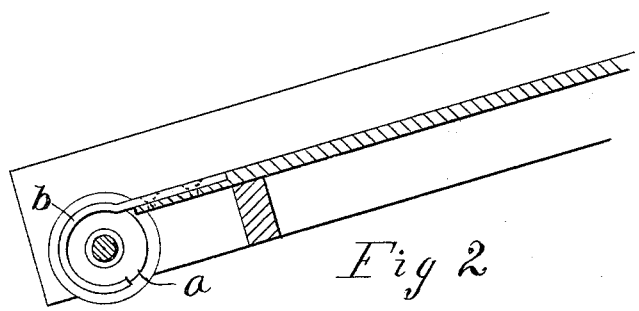
WITNESSES:
M Carsten
Frank A. Jacob.
INVENTORS:
Jonathan J. Moore,
James A. Ball,
By H. P. Hood
Atty.

UNITED STATES PATENT OFFICE.

JONATHAN J. MOORE AND JAMES A. BALL, OF THORNTOWN, INDIANA, ASSIGNORS OF ONE-HALF TO J. C. TAYLOR, OF SAME PLACE.

BELT-GUARD FOR STRAW-CARRIERS.

SPECIFICATION forming part of Letters Patent No. 318,491, dated May 26, 1885.

Application filed December 22, 1884. (No model.)

*To all whom it may concern:*

Be it known that we, JONATHAN J. MOORE and JAMES A. BALL, citizens of the United States, residing at Thorntown, in the county of Boone and State of Indiana, have invented a new and useful Improved Belt-Guard for Straw-Carriers, of which the following is a specification.

Our invention relates to an improved belt-guard adapted to be secured to the straw-carrier of a stacking-machine for the purpose of preventing the conveyer-belt from slipping off the driving-pulleys, and thereby becoming wedged between the edge of said pulleys and the bottom of the conveyer-trough, as hereinafter explained.

The accompanying drawings illustrate our invention.

Figure 1 represents an end elevation of a straw-carrier, showing our guard applied thereto. Fig. 2 is a side elevation of one of the driving-pulleys, a portion of the carrier-trough, and our guard applied thereto.

In this class of elevators the carrying-belt is formed of two or more narrow belts widely separated, and connected at intervals by strips of wood. Said belts pass over narrow-faced driving-pulleys at the lower end of the carrier-trough, said pulleys having flanges on their outer edges, which prevent the belts from slipping off outward; but on account of the connecting wooden strips said pulleys cannot be flanged on their inner edges, and when the carrier becomes clogged with straw, as is frequently the case, the belts will slip off the pulleys inward and become jammed between the inner edge of the pulley and the bottom of the carrier-trough. To avoid this difficulty, we secure to the bottom of the conveyer-trough, opposite the inner edge of each of the driving-pulleys *a a*, the guard *b*. Said guard is formed of a flat bar of iron, bent so as to be concentric with the pulley for about half the diameter of the pulley, and having a straight part provided with screw-holes by which it is secured to the trough. Said curved part is made flaring, as shown, being of the same or a little less diameter or radius as the pulley on that edge next the pulley, but of greater radius on the edge farthest from the pulley, so that when the pulley slips under the belt, the belt cannot slip off its inner edge, but is received on the guard, which, from its tapering form, tends to throw the belt back on the pulley.

We claim as our invention—

The combination, with the straw-carrier trough, the driving-pulleys, and the conveyer-belt, of the above-described belt-guard for straw-carriers, consisting of a pair of flat bars curved to form flaring partial rings, as described, secured to the straw-carrier trough and projecting outward therefrom along the sides of the driving-pulleys, in the manner and for the purpose specified.

JONATHAN J. MOORE.
JAMES A. BALL.

Witnesses:
JOHN C. TAYLOR,
H. P. HOOD.